United States Patent [19]
McKinney

[11] Patent Number: 5,770,081
[45] Date of Patent: Jun. 23, 1998

[54] APPARATUS FOR AND METHOD OF REDUCING SOLIDS AND CONTROLLING SURGES IN THE FLOW OF EFFLUENT FROM A WASTEWATER TREATMENT PLANT

[76] Inventor: Jerry McKinney, P.O. Box 9337, Beaumont, Tex. 77709

[21] Appl. No.: 815,627

[22] Filed: Mar. 13, 1997

[51] Int. Cl.[6] ..................................................... C02F 3/12
[52] U.S. Cl. .......................... 210/620; 210/801; 210/109; 210/202; 210/257.1; 210/532.1
[58] Field of Search .................................... 210/620–630, 210/801, 804, 808, 109, 195.1, 202, 209, 257.1, 532.1, 532.2, 533–537

[56] References Cited

U.S. PATENT DOCUMENTS

| | | | |
|---|---|---|---|
| 3,886,065 | 5/1975 | Kappe et al. | 210/620 |
| 4,608,157 | 8/1986 | Graves | 210/86 |
| 4,710,295 | 12/1987 | Zabel | 21/336 |
| 5,207,896 | 5/1993 | Graves | 210/109 |
| 5,221,470 | 6/1993 | McKinney | 210/151 |
| 5,382,357 | 1/1995 | Nurse | 210/170 |
| 5,413,706 | 5/1995 | Graves | 210/110 |
| 5,482,621 | 1/1996 | Nurse | 210/170 |
| 5,580,453 | 12/1996 | Nurse | 210/323.2 |
| 5,582,716 | 12/1996 | Nurse | 210/121 |
| 5,616,241 | 4/1997 | Khudenko | 210/195.1 |
| 5,639,371 | 6/1997 | Loy et al. | 210/624 |
| 5,647,986 | 7/1997 | Nawathe et al. | 210/624 |
| 5,665,236 | 9/1997 | Van Den Berg | 210/195.1 |

OTHER PUBLICATIONS

Zabel Multi–Purpose Filter, Zabel Industries Inc. (2 sided leaf).
New Zabel A1800 Residential Septic Tank Effluent Filter (2 sided leaf).
National Sanitation Foundation Report on Evaluaton of Norweco, Inc. Singulair (R) Model 820 and Model 900, pp. 14–15, pp. A24–25, pp. B 26–27.
Norweco brochure on Singulair™ Individual Home Wastewater Treatment System.
Norweco Singulair Technical Manual.

*Primary Examiner*—Thomas G. Wyse
*Attorney, Agent, or Firm*—Vaden, Eickenroth & Thompson, L.L.P.

[57] ABSTRACT

Apparatus for and a method of reducing solids and controlling surges in the flow of effluent from the clarifier chamber of an aerobic wastewater treatment plant. The apparatus is mounted inside the clarifier chamber of the wastewater treatment plant and connected to an outlet pipe of the plant. The apparatus includes a cylindrical tubular weir positioned in a cylindrical housing connected to the outlet pipe of the clarifier. The surge control weir assembly restricts the flow of the effluent from the clarifier resulting in an accumulation of effluent in the surge control weir assembly from which it flows at a rate proportioned to the volume retained in the assembly and resulting in a settling of minute suspended solids in the clarifier chamber. The surge control weir provides a final screening of the effluent through aerobic bacteria which grow in the slots of the assembly to digest the last solid particles from the water as the water slowly passes through the assembly.

12 Claims, 2 Drawing Sheets

APPARATUS FOR AND METHOD OF REDUCING SOLIDS AND CONTROLLING SURGES IN THE FLOW OF EFFLUENT FROM A WASTEWATER TREATMENT PLANT

BACKGROUND OF THE INVENTION

This invention relates to a surge control weir assembly that controls the rate of flow of water from the clarifier chamber of a wastewater treatment plant. This serves to eliminate or reduce disruption caused by peak flows which can disturb the settling characteristics of minute suspended solids and sweep them into the exiting effluent. The weir also filters the exiting water of larger particulate matter.

The volume of water used in commercial and residential applications vary throughout the day. Large increases in the amount of water flowing out of the outlet pipe to the downstream facilities can create problems by washing out with the effluent minute suspended solids which otherwise would settle in the clarifier. In addition to affecting effluent quality, peak flows can create problems for downstream pumps and tertiary treatment equipment.

An additional problem encountered with wastewater treatment plants is that the solids are not always converted before exiting the plant. Solids remaining in the wastewater when it enters the clarifier chamber are expected to be converted by the bacteria in the clarifier chamber before the water reaches the opening. However, this does not always happen. Drip irrigation systems using buried lines downstream of the outlet pipe of the wastewater treatment plant are one method employed to dispose of wastewater effluent. Drip irrigation systems typically employ pumps downstream from the treatment plants such that small particles in the water reaching such pumps tend to plug the pumps. Another method of disposing of wastewater effluent is through spray irrigation, which includes a downstream pump that delivers water to the sprinkler heads. Particles larger than 1/16 of an inch passing downstream can clog these pumps as well as the sprinkler heads. Small particles leaving the clarifier also increase the maintenance required on other pumps and tertiary equipment. Likewise, solid particles in the wastewater are pollutants which limit disposal options. Therefore, it is extremely important that the water leaving the plant be filtered to remove such particles.

A wire mesh screen, sand filter, or disc filter will tend to plug up over time as particles collect on conventional filter media. Therefore, they require backwashing periodically. There is a need to provide a method to remove the solids from the effluent while avoiding plugging of the media used for filtering.

A wide variety of filter devices for filtering wastewater systems are known in the art. U.S. Pat. No. 5,382,357 by Harry L. Nurse issued Jan. 17, 1995 discloses a filter for use specifically in an anaerobic septic tank comprising a vertical tubular housing in which a smaller diameter tubular member having a plurality of horizontal slots is positioned in and spaced from a tubular housing. Water flows through the slots then upwardly in the annulus between the slotted member and the housing to an outlet pipe at the top of the filter assembly. In the filter assembly of Nurse, the horizontal slots are wide enough and spaced close enough that they do not restrict the volume of water that is discharged through the outlet pipe. As opposed to restricting the flow, column 1 line 52 of the Nurse patent indicates that the Nurse filter "unexpectedly provide[s] increased capacity in the same volume as other filters" (emphasis added).

U.S. Pat. No. 5,221,470, which issued Jun. 22, 1993, discloses a filter for use in a clarifier upstream of the outlet. The filter is an elongated sheet of plastic material wound upon itself with adjacent layers narrowly spaced to form a plurality of upwardly extending, elongated, narrow passageways. Aerobic bacteria grows on the walls of the passageways and across the top of the filter to digest the last solid particles from the water as the water slowly flows upwardly through the filter to the outlet. While the filter does an excellent job of removing the final particles from the wastewater during normal flow, large increases in the volume of wastewater can cause some particles to flow out of the clarifier with the effluent. There are also filters that utilize timed flows such that a pump removes the water from a settling tank at a given rate. The settling tanks are sized large enough to allow for fluctuations in water level entering the tank. A pump is situated in the tank which is activated by a timer and, alternately, by a high liquid level alarm, such that water is pumped out of the tank at a specific rate. No hydraulic displacement is used.

Also, there are sock-type filters that use a fabric mesh to remove solid particle exiting the system. Exemplary of the sock-type filter is the filter described in U.S. Pat. No. 5,207,896 issued May 4, 1993 to Jan Graves and commercialized under the name SINGULAIR® Model 900. The sock-type or plug positive filter is described as a woven design flow filter mesh in which solids are trapped. The Graves patent discloses that, after flowing through one or more sock filter mesh, the liquid is "held" or slowly rises in a perimeter zone and solids are allowed to settle prior to passing to the next component. The apparatus consists of a 14-inch outside diameter system covered with a synthetic filter with components located in circular fashion within the system. This filter system includes two vertically spaced, one-quarter inch diameter flow equalization ports located on either side of the system. Surges of wastewater into the clarifier will raise the liquid level to the upper pair of flow equalization ports. For large increases in the volume of wastewater entering the clarifier, large peak flow openings or ports are located above the equalization ports. Second and subsequent equalization ports cause a step increase in the flow rate leaving the clarifier, this step increase being emphasized by subsequently higher ports having larger diameters. Intermittent peak hydraulic surges can flush solids from the aeration chamber into and throughout the clarification chamber before the solids have sufficient loss of velocity to settle. This sock filter type suffers from the disadvantage that a surcharge of solids can temporarily shock plug the design flow filter mesh causing a significant rise in the liquid level. Even under non-peak operating conditions, solids progressively plug the sock filter with increases in hydrostatic pressure causing particles to become deeply embedded in the mesh. Thus the sock filter acts to progressively restrict the flow of the water leaving the clarifier, such that the design equalization ports can not consistently serve their intended function. Also, without a bottom outlet, those solids which pass through the sock filter into the annulus between the sock and the equalization port surface will tend to collect at the bottom of the apparatus causing a build-up of sludge.

After passing through the flow equalization ports, the liquid drops vertically down to a deck containing an (optional) dry tablet chlorine feed tube. Gravity fall then takes the liquid vertically downward into the unbaffled contact zone. Retention of the flow in this unbaffled contact zone allows any remaining organic solids and bacteria to be stabilized, while separation of solids and settling again takes place.

Flow is then hydraulically displaced upwardly into the inlet zone of the compartmented contact basin, where solids are settled. Hydraulic displacement allows the flow to continue through the baffled chamber plates where settling takes place. Within each of the 37 chamber plates, each $\frac{1}{16}$" elongated opening provides a seven and six tenths foot horizontal weir. This weir, followed by a much larger open area immediately downstream, yields 281 feet of effective settling capacity for organic solids that have passed through the woven filter mesh.

While the equalization ports in Graves provide some resistance to the rate of liquid passing out of the clarifier, the flow rate increases dramatically if the second or subsequent set of equalization ports is reached by the liquid level. Also, the additional retention zone following the filter media and the equalization ports indicate that undesirable organic solids are expected to pass through the filter media and through the flow equalization ports.

There are two basic designs of aerobic wastewater treatment plants. The first includes a rectangular tank divided into an aeration chamber and a clarifier by a partition having an opening at the bottom through which wastewater can flow from the aerator to the clarifier. Fluid passing from the aeration chamber to the clarifier chamber must pass beneath this baffle. A deflector is often located to deflect solids settling out of the clarifier back into the aeration chamber.

The second basic design of treatment plants includes a cylindrical tank that is divided by an inverted, truncated cone into the two chambers, an outer aeration chamber and an inner clarifier chamber. This design can also incorporate a pyramid shaped deflector placed beneath the truncated conical partition to deflect solids from the aeration chamber back into the clarifier chamber. Both basic designs of treatment plants suffer from the problems listed above, namely, a sudden surge in the volume of effluent entering the plant, resulting in the discharge of raw or partially treated wastewater.

It is an object and feature of this invention to provide a surge control weir to limit the rate of increase in the volume of water discharged from the clarifier to a proportional amount of the volume of water entering the clarifier.

It is an object and feature of this invention to provide a surge control weir that reduces the rate of wastewater leaving the plant such that minute suspended solids are encouraged to settle to the bottom of the clarifier minimizing or eliminating the amount of minute suspended solids washed out with the effluent.

It is an object and feature of this invention to provide a surge control weir that filters out particles of larger than a preselected size from the water flowing out of the clarifier.

It is also an object and feature of this invention to provide a surge control weir which accommodates the gradual plugging of the weir between servicing of the unit.

It is a further object and feature of this invention to provide a surge control weir that reduces turbulence in the clarifier chamber to encourage the solids that can be carried into the clarifier by a surge of wastewater entering the aeration chamber to fall out the bottom of the clarifier chamber into the aeration chamber for further bacterial processing after the surge has been accommodated by the plant.

BRIEF SUMMARY OF THE INVENTION

The invention is a surge control weir assembly that meters the flow of treated wastewater leaving a clarifier chamber of a wastewater treatment plant in proportion to the rate of flow of water entering the clarifier chamber. This invention has utility in various metering or filtering applications, but is particularly useful in a residential wastewater treatment plant. In the residential wastewater treatment plant, wastewater flows intermittently and varies in volume between a normal flow such as the flushing of one toilet and peak flow that might include combining the volume of water produced by flushing one or more toilets with the water from a shower and a dishwasher or clothes washing machine.

The vertical tubular surge control weir assembly is located in the clarifier chamber upstream of an outlet pipe through which the effluent flows out of the plant and includes a tubular surge control weir within a tubular housing. The surge control weir assembly is mounted in the clarifier chamber such that the outlet pipe connected to the assembly is located just above the normal liquid level and the assembly rises a substantial distance above the outlet pipe. The width and length of slots in the surge control weir are such that as a normal or a peak flow of effluent enters the clarifier chamber, the level of effluent in the surge control weir assembly and the clarifier chamber will rise temporarily to accommodate the increased volume and then fall as the effluent flows through the slots in the surge control weir into an annular space and out of the clarifier chamber through the outlet pipe. Thus, for both normal and peak flows into the clarifier chamber, the flow of the effluent from the clarifier chamber is restricted by the narrow slots so that the rate of flow of the effluent from the clarifier is proportional to the rate of flow of water entering the clarifier to thereby maintain the effluent in the clarifier chamber longer and to eliminate turbulence so that minute suspended solids, or small particles, can fall out of the effluent back to the bottom of the clarifier instead of being washed out with the effluent. This also serves to restrict the rate of flow out of the clarifier chamber to protect downstream pumps and tertiary treatment equipment from being plugged by solids larger than the width of the slots or from being affected by large increases in volume.

These and other objects, advantages, and features of this invention will be apparent to those skilled in the art from a consideration of this specification including the attached drawings and appended claims.

DETAILED DESCRIPTION OF THE INVENTION

Figure 3:
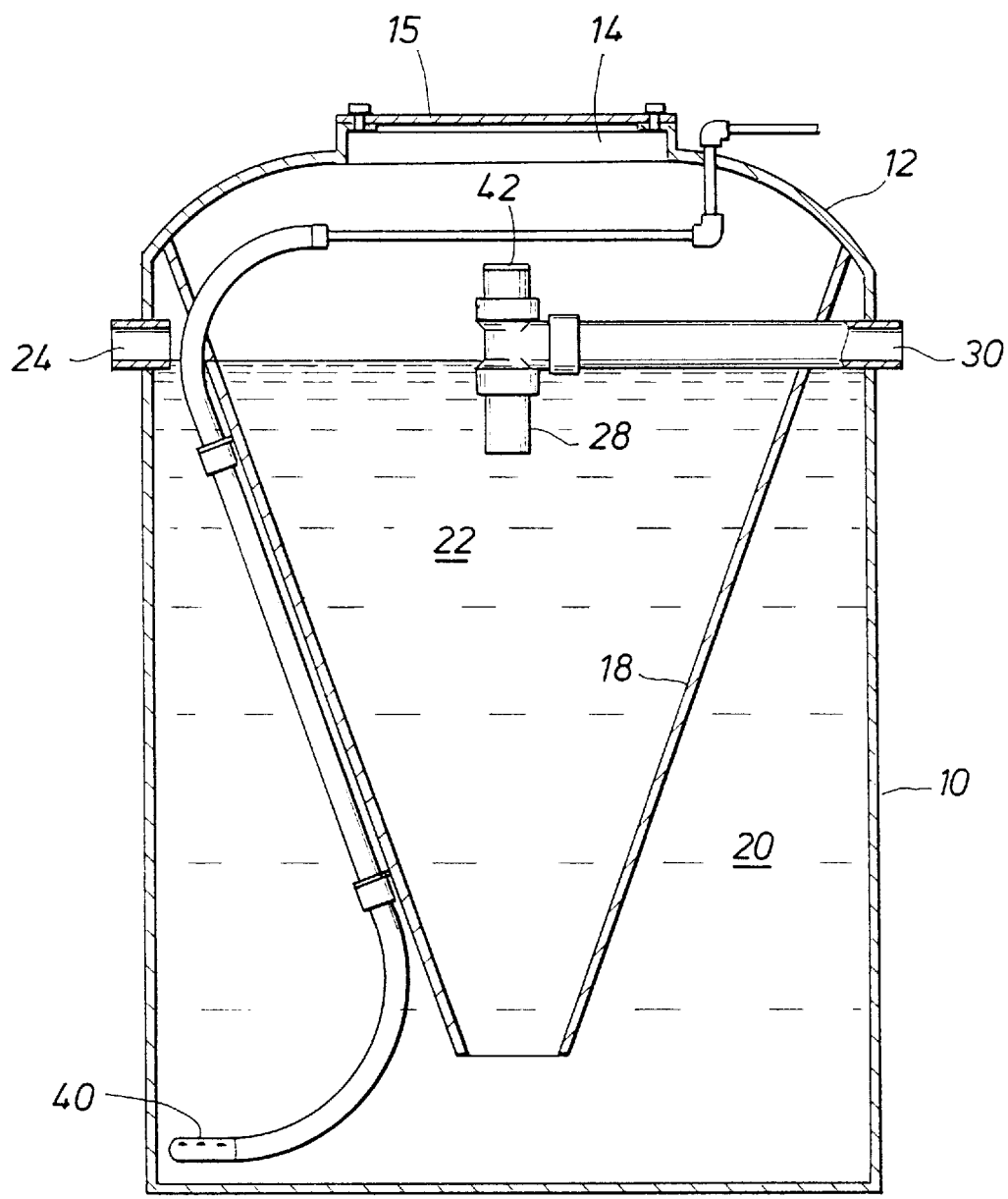
FIG. 3 is a vertical sectional view through a wastewater treatment plant equipped with the surge control weir of the inventions.

A preferred embodiment of this invention is the wastewater treatment plant shown in FIG. 3 includes cylindrical tank 10 with dome-shaped upper end 12. Hatch 14 is located in the upper end to provide access to the inside of the tank. Usually, the tank is buried in the ground so that only hatch 14 and its cover 15 are above ground. Inside the tank is partition 18 that is shaped like an inverted, truncated, cone. Its upper end is attached to the dome portion of the housing. This partition divides the tank into two chambers, 20 and 22. Chamber 20 is the aeration chamber and chamber 22 is the clarifier chamber.

In operation, wastewater from the residence or facility to which the plant is connected enters the aeration chamber through inlet 24. Air is supplied to aeration chamber 20 through diffuser 40. The wastewater flows through the aeration chamber 20 to clarifier chamber 22 and is discharged through outlet 30 after passing through surge control weir assembly 28.

Figure 1:
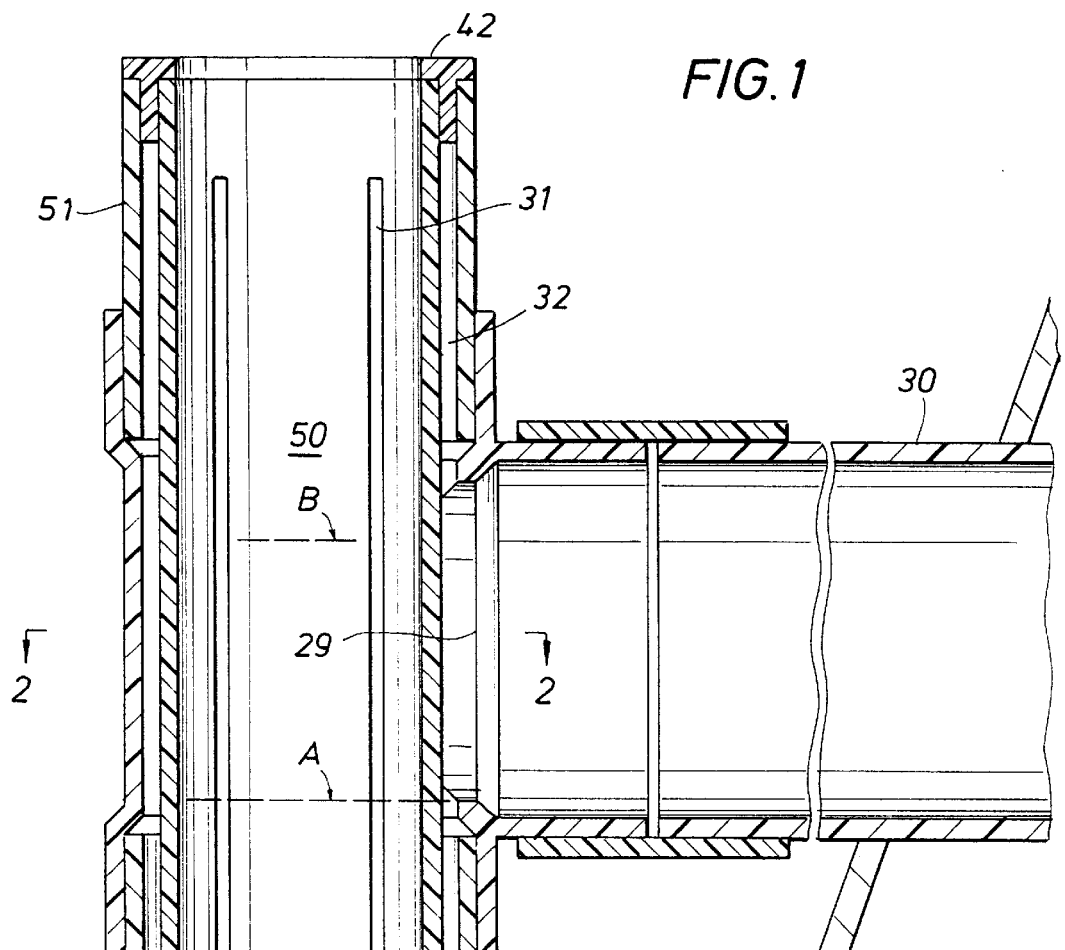
FIG. 1 is a vertical sectional view through the preferred embodiment of the surge control weir of this invention.

Surge control weir assembly 28 shown in FIG. 1 comprises a vertical tubular weir 50 provided with vertical slots 31. In the embodiment shown, four equally spaced slots are shown. The weir 50 is mounted in a vertical cylindrical housing 51. The inside diameter of housing 51 is greater than the diameter of weir 50, to provide annular space 32 into which the effluent flows after passing through slots 31 of the weir. Seal 41 is located at the lower and of annular space 32 between housing 51 and weir 50 to seal the bottom of the annular space. Cap 42 covers the top of the annular space 32 so that, while upward flow rate through weir 50 is a function of the hydrostatic head of the waste water in the clarifier and the width of the slots, the assembly provides a self-cleaning mechanism by allowing overflow if the height of the water exceeds the height of the assembly. Thus, if a build up of scum occurs within the assembly plugging the weir, the scum will be carried over the top of the assembly where it will be dispersed across the large area of the clarifier.

In operation, when no wastewater is entering aerator 20, the level of water in weir 50 is at about even with the outlet as indicated by dotted line A in FIG. 1. Assume an increase in the water level in the clarifier of three inches to line B. Four $1/16$" wide slots provide a total area of only about 0.75 square inches, through which the three inch rise in water level must flow. The volume increase in the weir alone is about 28.9 cubic inches, assuming an inside diameter of 3.5 inches, so it is clear that the rate of flow of water through the weir is much smaller than it would be through the outlet pipe, which is usually about four inches in inside diameter or about 12 square inches in cross sectional area, if the surge control weir of the invention was not in place in the outlet of the clarifier.

Figure 2:
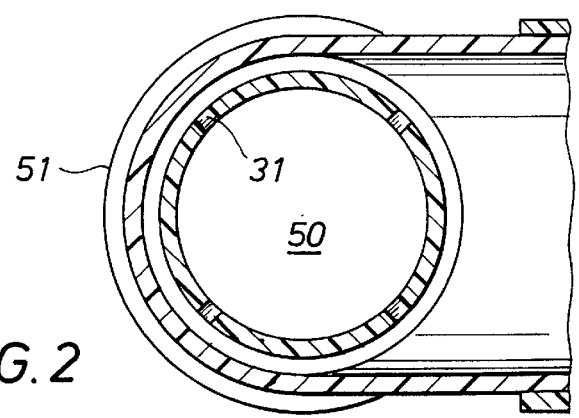
FIG. 2 is a sectional view taken along line 2—2 of FIG. 1.

The surge control weir also serves to inhibit solids greater than the slot width from passing from clarifier chamber 22 to the outlet pipe 30. In a preferred embodiment, the surge control weir and housing extend above the top of lateral opening 29 far enough to accommodate a substantial increase of the level of effluent in the assembly due to the gradual plugging over time of the lower portions of the slots by bacteria, solid particles or scum. A preferred embodiment consists of a surge control weir about 9" long with four vertical slots of about $1/16$" width. Small variations in width are expected during manufacture. of the 9" in length, about 6" rise above the opening. A preferred embodiment shown in the plan view of FIG. 2 shows four slots spaced equally around the circumference of the surge control weir.

The tubular surge control weir serves among other things, to produce laminar flow from clarifier chamber 22 to outlet pipe 30 thus allowing solids to settle back into the clarifier chamber and allowing bacteria to grow in the flow control assembly. Minute suspended solids generally settle at a particular rate when undisturbed. Surge control permits these minute suspended solids to settle without disruption, thus ensuring the quality of the effluent. The bacterial growth covers the slots and restricts but does not stop the flow of effluent through the slots providing the bacteria a final opportunity to remove any remaining solids from the effluent. Cap 42 as well as weir 50 and housing 51 provide additional areas for aerobic bacterial growth. As the bacteria grows in the slots, the flow of the effluent through the slots is restricted causing the level of water to increase within the tubular weir. It has been found that slots about 9" long, even when partially closed by bacterial growth will pass sufficient water to accommodate surges of wastewater into the clarifier. This is particularity true when the clarifier is an inverted truncated cone as shown in FIG. 3 since the capacity of the clarifier increases exponentially as the liquid level increases. As the water in the surge control weir assembly subsides, the bacteria dries and flakes off over time, leaving the sections of the slots above the water level clean. Likewise, it can be observed that water flowing through the weir over the top of any solids accumulated in the slots acts to "erode" the solids, slowly cutting away the mass. As stated above, when conditions are static and no effluent is entering or leaving, the water level in the clarifier is about even with the bottom of the opening from the annular space. In a preferred embodiment, the housing of the surge control weir assembly extends a distance below the bottom of the opening from the annular space such that this length of housing is always submerged. This area which is submerged provides additional media for growth of bacteria to assure sufficient polishing of the effluent. This distance also provides that water entering the assembly will be taken from a level below any scum layer which may accumulate on the surface of the wastewater in the clarifier chamber and above any blanket of minute suspended solids forming at the bottom of the clarifier. A preferred embodiment includes submerging six inches of the housing into the liquid in the clarifier when the clarifier is at rest.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense, and equivalent structures will become apparent to those skilled in the art to which the invention pertains.

For example, other embodiments of this invention include different orientations for the slots or different edges on the slots. With sharp-edged weirs, the sheet of discharging liquid, called the "nappe," contracts as it leaves the opening and free discharge occurs. Rounding the upstream edge will reduce the contraction and increase the flow rate for a given head. Thus, flow rate and flow pattern through the slots is a design feature. As a further example, the control of the flow rate from the clarifier can be accomplished by using diagonal slots.

A preferred embodiment of the invention described above includes a slot width of $1/16$". This slot width not only dictates the flow of water leaving the clarifier, but also the size of particle which can exit the clarifier. Since downstream pumps, for example, may be capable of handling larger or smaller particle sizes, this invention encompasses slot width designs which meet the criteria of reducing surges and meeting the particle size criteria for downstream operations.

Likewise, a preferred embodiment provides four slots of about $1/16$" width. This embodiment is particularly suitable for a standard 500 gallon per day treatment tank for residential use. Other embodiments would provide for scaling up for use with a larger volume tank. This scaling up can include additional slots and/or additional slot width and/or additional slot length. Such embodiments would serve to restrict surges from leaving the clarifier while removing particulate matter down to a size dictated by downstream use.

Also, another embodiment includes having a housing which does not extend a distance into the clarifier section when the clarifier is at rest. While this submersion provides additional polishing, a biomat growing on the surge control weir itself will cause polishing.

Another embodiment of this invention includes placing the surge control weir assembly outside of the treatment plant where it functions in the same manner. Placement of the assembly inside the clarifier in a centered or off-centered orientation is also encompassed.

From the foregoing it will be seen that this invention is one well adapted to attain all of the ends and objects hereinabove set forth, together with other advantages which are obvious and which are inherent to the apparatus and structure.

What is claimed is:

1. In a wastewater treatment plant including an aeration chamber into which wastewater flows to be exposed to aerobic bacteria to convert organic solids in the wastewater to water and $CO_2$ and a clarifier chamber in which effluent from the aeration chamber flows upwardly toward an outlet pipe through which the effluent flows from the plant, the improvement comprising a surge control weir assembly mounted in the clarifier upstream of the outlet pipe to control the rate wastewater flows out of the plant as a function of the volume entering the aerator, the assembly comprising a vertical tubular housing located in the clarifier chamber upstream of the outlet pipe and extending above and below the outlet pipe, said housing having a lateral opening connected to the outlet pipe, a surge control weir comprising a tubular member of smaller diameter than the housing mounted concentrically within the housing to provide an annular space between the surge control weir and the tubular housing, a seal between the surge control weir and the housing closing the lower end of the annular space, the surge control weir having a plurality of narrow slots through which wastewater can flow into the annular space and through the outlet pipe, and said surge control weir being positioned so that the level of effluent in the annular space, when conditions are static and no effluent is entering or leaving, is about even with the bottom of the lateral opening in the tubular housing and the width and length of the slots being such that as effluent enters the clarifier chamber, the level of effluent in the weir and the clarifier chamber will increase temporarily to accommodate the increased volume and then fall as the effluent flows through the narrow slots in the surge control weir into the annular space and out of the clarifier chamber through the outlet pipe so that for both normal and peak flows into the clarifier chamber, the flow of the effluent from the clarifier chamber is a function of the width of the slots and the height the effluent rises in the vertical tubular housing of the surge control weir assembly to thereby maintain the effluent in the clarifier chamber longer to eliminate turbulence so that small particles can fall out of the effluent back into the clarifier and to protect downstream pumps and tertiary treatment equipment from sudden large increases in the volume of the water discharged from the clarifier and from being plugged by solids larger than the width of the slots.

2. The surge control weir assembly of claim 1 in which the narrow slots in the surge control weir extend vertically from just above the bottom of the surge control weir to just below the top of the surge control weir and the surge control weir and housing extend above the top of the opening far enough to accommodate a substantial increase of the level of effluent in the assembly due to the plugging of the lower portions of the slots by bacteria, particles or scum formed on top of the effluent as it rises in the surge control weir assembly.

3. The surge control weir assembly of claim 2 in which the slots are about 1/16 of an inch wide.

4. The surge control weir assembly of claim 3 in which four circumferentially spaced slots are provided in the surge control weir.

5. The surge control weir assembly of claim 4 in which the slots in the assembly are about nine inches long to accommodate a rise in the effluent in the clarifier chamber due to plugging of six inches.

6. The surge control weir assembly of claim 5 in which the housing extends below the opening so that the housing is submerged in the effluent in the clarifier when conditions are static.

7. A wastewater treatment plant comprising:
an aeration chamber into which the wastewater flows to be exposed to aerobic bacteria to convert the organic solids in the wastewater to water and $CO_2$;
a clarifier chamber in which effluent from the aeration chamber flows upwardly toward an outlet pipe through which the effluent flows from the system;
a vertical tubular surge control weir assembly located in the clarifier chamber upstream of the outlet pipe into which the effluent rises, said surge control weir assembly further comprising:
a vertical tubular surge control weir, said surge control weir having a plurality of narrow slots,
a vertical tubular housing surrounding the surge control weir and spaced therefrom to provide an annular space between the surge control weir and the housing,
a seal between the surge control weir and the housing to close the lower end of the annular space, and
a lateral opening in the tubular housing through which the effluent can flow out of the annular space and through the outlet pipe, said surge control weir assembly being positioned so that the level of effluent in the annular space, when conditions are static and no effluent is entering or leaving, is about even with the bottom of the lateral opening in the tubular housing and the width and length of the slots are such that as effluent enters the clarifier chamber, the level of effluent in the weir and the clarifier chamber will increase temporarily to accommodate the increased volume and then fall as the effluent flows through the slots in the surge control weir into the annular space and out of the clarifier chamber through the outlet pipe so that for both normal and peak flows into the clarifier chamber, the flow of the effluent from the clarifier chamber is a function of the width of the slots and the height the effluent rises in the vertical tubular housing of the surge control weir to thereby maintain the effluent in the clarifier chamber longer to eliminate turbulence so that small particles can fall out of the effluent back into the clarifier and to protect downstream pumps and tertiary treatment equipment from sudden large increases in the volume of the water discharged from the clarifier and from being plugged by solids larger than the width of the slots.

8. A method of restricting the flow of wastewater from the clarifier of a wastewater treatment plant to prevent large increases in the volume of water flowing out of the clarifier as a result of substantial increases in the volume of wastewater flowing into the clarifier, the method comprising flowing the effluent through a surge control weir assembly that allows the effluent to flow through the surge control weir assembly at a rate proportioned to the volume of effluent in the surge control weir assembly.

9. The method of claim 8 in which the effluent flows out of the surge control weir assembly through elongated narrow slots.

10. The method of claim 9 in which the slots are about $\frac{1}{16}$ of an inch wide and at least nine inches long.

11. A method of controlling the volume rate of effluent flowing from a clarifier chamber of an aerobic wastewater treatment plant comprising the steps of:

flowing the effluent from the clarifier chamber upwardly in a vertical surge control weir assembly, passing the effluent through narrow slots in the side of a vertical tubular weir that allow a predetermined maximum volume of effluent to flow through the slots into an annular space between the tubular weir and a tubular housing for each unit of depth of effluent in the surge control weir assembly, flowing the effluent out of the annular space through a lateral opening positioned adjacent the lower end of the annular space, positioning the tubular control weir assembly with the lateral opening adjacent the normal level of effluent in the clarifier chamber with a substantial portion of the tubular weir and the housing extending thereabove to control any excess volume flowing into the clarifier chamber by allowing the level of filtered effluent to rise as required in the surge control weir assembly and the annular space.

12. The method of claim 10 in which the slots are about $\frac{1}{16}$ of an inch wide to retain solid particles larger than $\frac{1}{16}$ inch in the clarifier chamber where the solid particles fall to the bottom of the clarifier chamber and from there into the aeration chamber after the flow of effluent into the surge control weir assembly stops.

\* \* \* \* \*

UNITED STATES PATENT AND TRADEMARK OFFICE
CERTIFICATE OF CORRECTION

PATENT NO. : 5,770,081
DATED : June 23, 1998
INVENTOR(S) : Jerry McKinney

It is certified that error appears in the above-indentified patent and that said Letters Patent is hereby corrected as shown below:

Column 5, line 15, change "and" to --end--.

Column 5, line 50, change "of" to --Of--;

Column 5, line 51, after "6"" insert --of the weir should--.

Signed and Sealed this

Twenty-second Day of September, 1998

BRUCE LEHMAN

Attest:

Attesting Officer

Commissioner of Patents and Trademarks